United States Patent
Lee et al.

(10) Patent No.: US 8,836,860 B2
(45) Date of Patent: Sep. 16, 2014

(54) METHOD AND APPARATUS FOR CONVERTING IMAGE RATE BY USING IMAGE SCALING

(75) Inventors: Jae-hyang Lee, Suwon-si (KR);
Tae-gyoung Ahn, Yongin-si (KR);
Jae-Hyun Kim, Suwon-si (KR);
Se-hyeok Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 88 days.

(21) Appl. No.: 13/590,627

(22) Filed: Aug. 21, 2012

(65) Prior Publication Data

US 2013/0063656 A1   Mar. 14, 2013

(30) Foreign Application Priority Data

Sep. 9, 2011   (KR) .......................... 10-2011-0092221

(51) Int. Cl.
| | |
|---|---|
| H04N 7/01 | (2006.01) |
| H04N 11/20 | (2006.01) |
| H04N 19/132 | (2014.01) |
| H04N 5/14 | (2006.01) |
| G06T 3/40 | (2006.01) |
| H04N 19/40 | (2014.01) |
| H04N 19/139 | (2014.01) |

(52) U.S. Cl.
CPC ........ *G06T 3/4092* (2013.01); *H04N 19/00127* (2013.01); *H04N 5/145* (2013.01); *H04N 19/00472* (2013.01); *H04N 19/00151* (2013.01)
USPC .......................................... 348/452; 348/441

(58) Field of Classification Search
CPC .......... H04N 13/0007; H04N 13/0029; H04N 19/00066; H04N 19/00; H04N 7/01; G09G 3/003; G09G 3/20
USPC ................. 348/452, 441, 448, 458, 459, 699; 382/107
IPC ............................................... H04N 7/01, 11/20
See application file for complete search history.

(56) References Cited

U.S. PATENT DOCUMENTS

| | | | |
|---|---|---|---|
| 6,847,406 B2 | 1/2005 | Dantwala et al. | |
| 7,295,245 B2 * | 11/2007 | Ha | 348/452 |
| 8,081,255 B2 * | 12/2011 | Koshimizu et al. | 348/441 |
| 8,531,601 B2 * | 9/2013 | Kobayashi | 348/452 |
| 2007/0297513 A1 * | 12/2007 | Biswas et al. | 375/240.16 |

* cited by examiner

*Primary Examiner* — Trang U Tran
(74) *Attorney, Agent, or Firm* — Sughrue Mion, PLLC

(57) ABSTRACT

A method of converting an image rate by using image scaling includes changing a resolution of an input original image sequence and generating a changed resolution image sequence; determining a first motion vector by estimating motion of a first image by using a plurality of images from the changed resolution image sequence; determining a second motion vector by modifying the first motion vector of the first image to correspond to a resolution of an original image of the original image sequence, where the original image corresponds to the first image; detecting characteristic information of the original image; determining a third motion vector corresponding to the resolution of the original image by compensating the second motion vector based on the detected characteristic information; and converting an image rate of the input original image sequence based on the detected characteristic information of the original image and the third motion vector.

23 Claims, 5 Drawing Sheets

METHOD AND APPARATUS FOR CONVERTING IMAGE RATE BY USING IMAGE SCALING

CROSS-REFERENCE TO RELATED PATENT APPLICATION

This application claims the benefit of Korean Patent Application No. 10-2011-0092221, filed on Sep. 9, 2011, in the Korean Intellectual Property Office, the disclosure of which is incorporated herein in its entirety by reference.

BACKGROUND

1. Field

Exemplary embodiments relate to an image processing scheme using image scaling.

2. Description of the Related Art

The amount of high-quality image content and broadcasting content has gradually increased. As high-quality image content will continue to be developed, the image size and resolution of the image content will increase as well as compared to previous-generation images. A high-quality image has a relatively larger amount of data than a low-quality image. Accordingly, high-quality image processing apparatuses require more hardware resources and much larger amounts of time and calculation for moving, storing, and reproducing image data in comparison to existing image processing apparatuses.

Image processing schemes for modifying a high-quality original image into a small-sized image, image-processing the small-sized image, restoring the image-processed image to a size of the original image, and then outputting the restored image are widely used. However, since detailed information is lost while increasing or reducing the size of an image, even when the size of the image is restored to that of an original image after a reduction in the size of the image, an error may occur when processing the original image and the restored image.

SUMMARY

According to an aspect of an exemplary embodiment, a method of converting an image rate by using image scaling implemented by a processor includes: changing a resolution of an input original image sequence and generating a changed resolution image sequence; determining a first motion vector by estimating motion of a first image by using a plurality of images from the changed resolution image sequence; determining a second motion vector by modifying the first motion vector of the first image to correspond to a resolution of an original image of the original image sequence, wherein the original image corresponds to the first image; detecting characteristic information of the original image; determining a third motion vector corresponding to the resolution of the original image by compensating the second motion vector based on the detected characteristic information; and converting an image rate of the input original image sequence based on the detected characteristic information of the original image and the third motion vector.

The determining of the third motion vector may include locally re-detecting a motion vector of a region of the original image determined based on the detected characteristic information; and determining the third motion vector by combining the detected characteristic information, the second motion vector, and the re-detected motion vector.

The converting of the image rate may include generating a first conversion image of the original image for converting the image rate of the input original image sequence, by using the input original image sequence and the third motion vector; generating a second conversion image of the original image for converting the image rate of the input original image sequence, by using the input original image sequence; and selecting and outputting the first conversion image or the second conversion image based on the detected characteristic information.

According to another aspect of an exemplary embodiment an apparatus for converting an image rate by using image scaling, the apparatus being associated with an image processor includes: the image processor operable to configure: an image scaling unit for changing a resolution of an input original image sequence and generates a changed resolution image sequence; a motion estimation unit for determining a first motion vector by estimating motion of a first image by using a plurality of images of the changed resolution an image sequence; a motion vector scaling unit for determining a second motion vector by modifying the first motion vector of the first image to correspond to a resolution of an original image of the original image sequence, wherein the original image corresponds to the first image; an image characteristic detection unit for detecting characteristic information of the original image; a motion vector post-processing unit for determining a third motion vector corresponding to the resolution of the original image by compensating the second motion vector based on the detected characteristic information; and an image rate conversion unit for converting an image rate of the input original image sequence based on the detected characteristic information of the original image and the third motion vector.

According to another aspect of an exemplary embodiment a computer-readable recording medium includes: a computer program for executing the above method recorded thereon.

BRIEF DESCRIPTION OF THE DRAWINGS

The above and other features and advantages of the inventive concept will become more apparent by describing in detail exemplary embodiments thereof with reference to the attached drawings in which.

DETAILED DESCRIPTION OF EXEMPLARY EMBODIMENTS

Hereinafter, the inventive concept will be described in detail by explaining exemplary embodiments with reference to the attached drawings.

As used herein, expressions such as "at least one of," when preceding a list of elements, modify the entire list of elements and do not modify the individual elements of the list.

Figure 1:
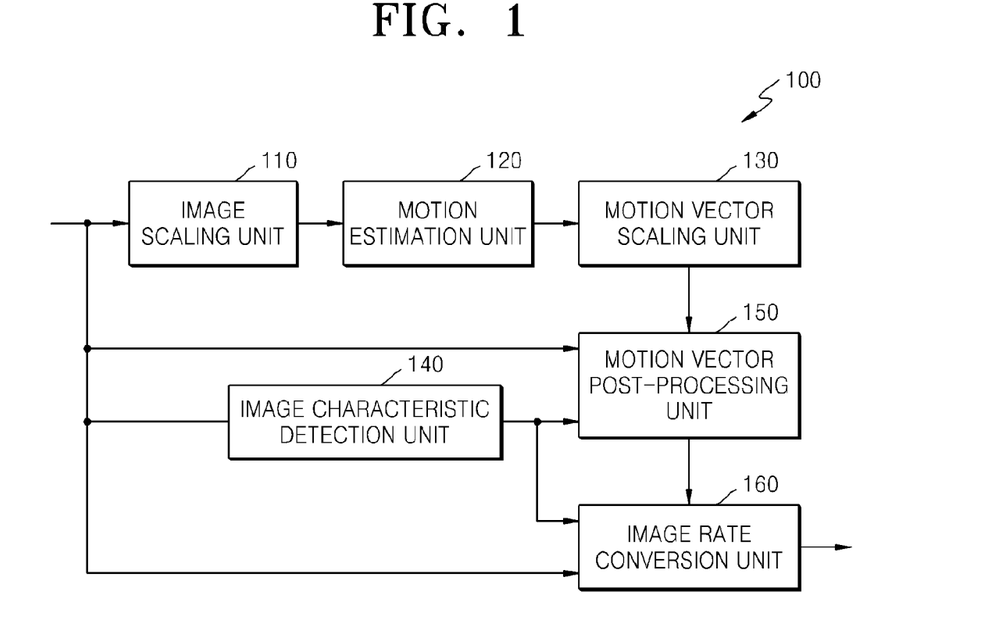
FIG. 1 is a block diagram of an apparatus for converting an image rate by using image scaling, according to an exemplary embodiment.

FIG. 1 is a block diagram of an apparatus 100 for converting an image rate by using image scaling, according to an exemplary embodiment.

The image rate conversion apparatus 100 includes an image scaling unit 110, a motion estimation unit 120, a motion vector scaling unit 130, an image characteristic detection unit 140, a motion vector post-processing unit 150, and an image rate conversion unit 160.

The image rate conversion apparatus 100 may operate in association with or by the control of a processor such as an image processing unit (IPU) or a graphic processing unit (GPU).

The image rate conversion apparatus 100 may receive an image sequence and may convert an image rate of the input image sequence. The image sequence may be a video, a picture sequence, a frame sequence, etc. The image rate indicates the number of images transmitted or reproduced for a certain period of time, and is similar to a frame rate of a video reproduction apparatus.

The image scaling unit 110 changes a resolution of the input image sequence. The image scaling unit 110 may perform image scaling.

According to an exemplary embodiment, a change of a resolution of an image may include performing image scaling to increase or reduce a size of the image.

According to an exemplary embodiment, the resolution of an input image sequence or an output image sequence may be an ultra-high definition (UHD)-level resolution, a high definition (HD)-level resolution, or a standard definition (SD)-level resolution. For example, a change of a resolution may include reducing the resolution from a UHD-level resolution to an HD-level (SD-level) resolution, or from an HD-level resolution to an SD-level resolution, and increasing the resolution from an HD-level (SD-level) resolution to a UHD-level resolution, or an SD-level resolution to an HD-level resolution.

The image rate conversion apparatus 100 may generate and output an image sequence having an image rate different from that of the input image sequence by using the input image sequence.

The motion estimation unit 120 performs motion estimation on a first image of an image sequence generated due to the change of the resolution. The motion estimation unit 120 may determine a first motion vector by estimating motion of the first image by using a plurality of images in the image sequence generated due to the change of the resolution.

For example, a motion vector indicating an image referred by the first image from among a plurality of images temporally adjacent to the first image may be determined as the first motion vector.

The motion vector scaling unit 130 may receive the first motion vector of the first image from the motion estimation unit 120, and may determine a second motion vector by modifying the first motion vector to correspond to a resolution of an original image (hereinafter referred to as an 'original resolution') of the first image. The motion vector scaling unit 130 may estimate the second motion vector corresponding to the original resolution from the first motion vector.

The image characteristic detection unit 140 may receive the original image of the first image of the input image sequence, and may detect characteristic information of the original image.

For example, detailed information is possibly lost due to the change of the resolution of the original image. According to an exemplary embodiment, the image characteristic detection unit 140 may detect the detailed information. The detailed information may include at least one of a high-frequency component and a repeated pattern of the original image.

For example, the image characteristic detection unit 140 may compare the original image to a restoration image obtained by restoring the first image to the resolution of the original image, and may detect the characteristic information of the original image based on a result of the comparing.

The motion vector post-processing unit 150 may receive the characteristic information of the original image from the image characteristic detection unit 140, may compensate the second motion vector based on the characteristic information, and may determine the compensated second motion vector as a third motion vector. Like the second motion vector, the third motion vector corresponds to the original resolution.

For example, the motion vector post-processing unit 150 may determine a predetermined region of the original image based on the characteristic information, and may locally re-detect a motion vector of the determined region. The motion vector post-processing unit 150 may determine the third motion vector by combining the characteristic information, the second motion vector, and the re-detected motion vector.

The motion vector post-processing unit 150 may determine a region of the original image, of which detailed information is lost due to the change of the resolution, based on the characteristic information detected from the original image, and may re-detect a motion vector of the determined region. The motion vector post-processing unit 150 may determine the third motion vector by compensating the second motion vector corresponding to the region determined based on the characteristic information into the re-detected motion vector.

The image rate conversion unit 160 may convert the image rate of the input image sequence based on the characteristic information of the original image input from the image characteristic detection unit 140 and the third motion vector input from the motion vector post-processing unit 150. The image rate conversion unit 160 may receive original images of the input image sequence, and may output an image sequence having the converted image rate.

The image rate conversion unit 160 may generate at least one candidate conversion image from the original images of the input image sequence, in order to convert the image rate of the input image sequence.

For example, the image rate conversion unit 160 may generate a first conversion image of the original image by using the input image sequence and the third motion vector. The image rate conversion unit 160 may generate a second conversion image of the original image by using the input image sequence. The image rate conversion unit 160 may select and output one of the first and second conversion images based on the characteristic information of the original image.

The image rate conversion unit 160 may determine a total number of conversion images with respect to the original image based on the converted image rate. For example, the image rate conversion unit 160 may determine two or more conversion images with respect to one original image according to a conversion ratio of the image rate. In this case, the image rate conversion unit 160 may generate and select one of the first and second conversion images with respect to one original image.

The conversion images selected with respect to the original images may be reconfigured, and thus, a resultant image sequence may be output. An output image sequence may be reconfigured by combining the original images and the newly generated and selected conversion images.

For example, the motion estimation unit 120 may spatially divide the first image into a plurality of regions and may estimate motion of each divided region. That is, the motion estimation unit 120 may separately determine motion vectors corresponding to the divided regions by performing motion estimation on each of the divided regions of the first image. In this case, the motion vectors may include first motion vectors indicating divided regions of neighboring images that are separately referred by the divided regions of the first image.

The motion vector scaling unit 130 may determine second motion vectors by modifying the first motion vectors of the divided regions of the first image. The second motion vectors may correspond to the divided regions of the first image and may be motion vectors of original divided regions having the original resolution.

The motion vector post-processing unit 150 may determine third motion vectors by compensating the second motion vector corresponding to the region determined based on the characteristic information of the original image into the re-detected motion vector. That is, the third motion vectors determined by the motion vector post-processing unit 150 may be motion vectors of the original divided regions, and may include the second motion vectors and the re-detected motion vector.

The image rate conversion apparatus 100 may reduce the amount of calculation by using resolution-changed or size-changed images of an input image sequence in order to convert an image rate of the input image sequence. Characteristic information regarding detailed information that is lost due to a change of a resolution or a size of an input image sequence is extracted. A motion vector based on the extracted characteristic information is re-determined and an image rate of the input image sequence by using the re-determined motion vector is converted. Accordingly, image quality deterioration that is possibly caused when an image rate is converted due to a change of a resolution or a size of an image may be prevented.

Accordingly, since an image rate of an input image sequence is converted by using resolution-changed or size-changed images of the input image sequence, the image rate conversion apparatus 100 may reduce a process time, may save hardware resources, may maintain detailed information that is possibly lost due to a change of a resolution or a size of an image. Thus, may output an image sequence by minimizing image quality deterioration that is caused when the image rate is converted.

Also, the image rate conversion apparatus 100 may change a resolution of an input image, may detect a motion vector from the resolution-changed image by performing motion estimation, and may modify the detected motion vector to correspond to an original resolution so as to use the modified motion vector to convert an image rate. In this case, the change of a resolution may include increasing and reducing the resolution.

For example, if the image rate conversion apparatus 100 receives a UHD-level image sequence, the image scaling unit 110 may reduce a UHD-level input image into an HD-level image, and the motion estimation unit 120 may detect an HD-level motion vector from the HD-level image. The motion vector scaling unit 130 may estimate a UHD-level motion vector from the HD-level motion vector, and the image characteristic detection unit 140 may determine characteristic information of the UHD-level input image. The motion vector post-processing unit 150 may compensate the UHD-level motion vector by using the characteristic information of the UHD-level input image. The image rate conversion unit 160 may output an image-rate-converted UHD-level image sequence by using the UHD-level input image and the compensated UHD-level motion vector.

For example, if the image rate conversion apparatus 100 receives an HD-level image sequence, the image scaling unit 110 may enlarge an HD-level input image into a UHD-level image, and the motion estimation unit 120 may detect a UHD-level motion vector from the UHD-level image. The motion vector scaling unit 130 may estimate an HD-level motion vector by using the UHD-level motion vector. The image characteristic detection unit 140 may determine characteristic information of the HD-level input image, and the motion vector post-processing unit 150 may compensate the HD-level motion vector by using the characteristic information of the HD-level input image. The image rate conversion unit 160 may output an image-rate-converted HD-level image sequence by using the HD-level input image and the compensated HD-level motion vector.

An operation of converting an image rate of a UHD-level image sequence in the image rate conversion apparatus 100 will now be described in detail with reference to FIGS. 2 through 6.

Figure 2:
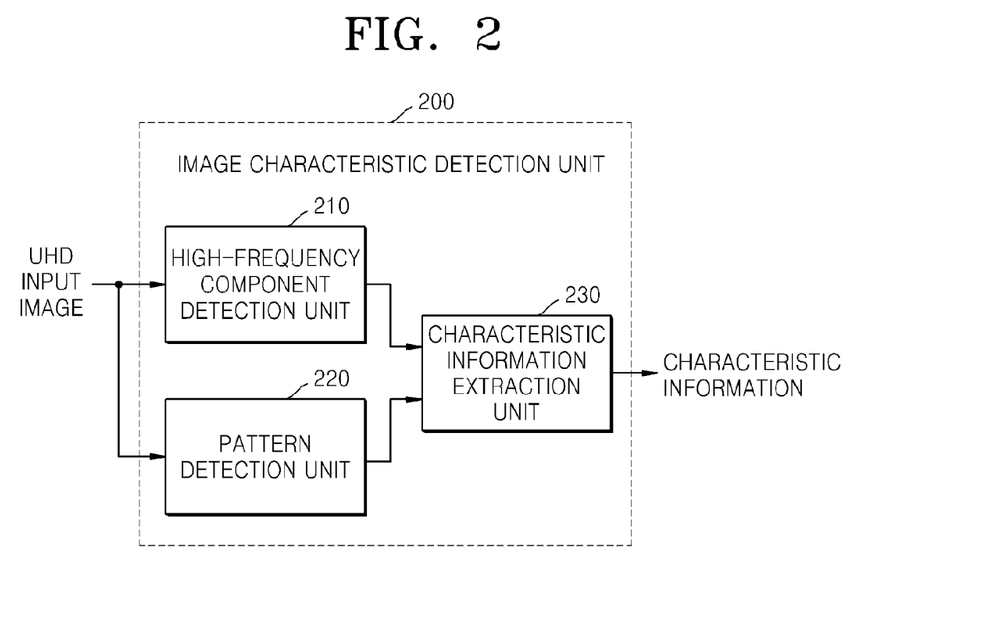
FIG. 2 is a block diagram of an image characteristic detection unit of the image rate conversion apparatus illustrated in FIG. 1 according to an aspect of an exemplary embodiment.

FIG. 2 is a block diagram of an example of the image characteristic detection unit 140 of the image rate conversion apparatus 100 illustrated in FIG. 1.

As an exemplary embodiment of the image characteristic detection unit 140 of the image rate conversion apparatus 100, an image characteristic detection unit 200 may receive an original image of an input image sequence, and may detect characteristic information of the original image. In particular, the image characteristic detection unit 200 may receive an original image of a UHD-level image sequence, and may detect detailed information that is possibly lost due to a change of a resolution of a UHD input image.

The image characteristic detection unit 200 may include a high-frequency component detection unit 210, a pattern detection unit 220, and a characteristic information extraction unit 230.

The high-frequency component detection unit 210 may detect a high-frequency component from the UHD input image, and the pattern detection unit 220 may detect a repeated pattern from the UHD input image. The characteristic information extraction unit 230 may output information indicating at least one of the high-frequency component and the repeated pattern detected by the high-frequency component detection unit 210 and the pattern detection unit 220 as characteristic information of the UHD input image.

In order to convert an image rate by using image scaling, a low-resolution image may be generated from a high-resolution original image by performing processing such as scaling, and a low-resolution motion vector may be generated by performing motion estimation on the generated low-resolution image. Also, a high-resolution motion vector may be generated by restoring the low-resolution motion vector to an original resolution, and an image rate of the original image of the input image sequence may be converted by using the high-resolution motion vector. In an image rate conversion scheme using image scaling, since motion estimation having a large amount of calculation data and requiring a large amount of calculation time is performed on a low-resolution image, a data processing speed may be improved and required hardware resources may be reduced.

However, in the above scheme, detailed information of a complicated image such as a certain pattern or a texture may be probably lost while an original image is processed such that an error may inevitably occur in the processed image or between the processed image and the original image.

For example, if detailed information of a texture image is lost due to image scaling, image quality deterioration such as flickering may occur in a resultant image generated after an image rate is converted.

Figure 3:
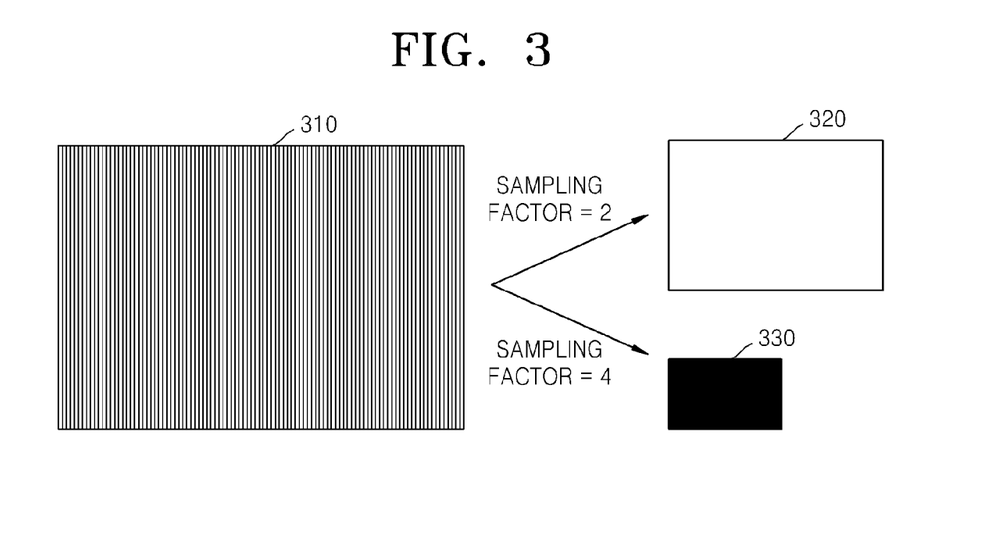
FIG. 3 is a diagram showing images sampled from a repeated pattern according to an aspect of an exemplary embodiment.

FIG. 3 is a diagram showing images sampled from a repeated pattern.

An original image 310 including a repeated pattern, in which vertical lines of black pixels and vertical lines of white pixels alternate with each other, has a repetition cycle of 1 or 2 pixels. Accordingly, an image reduction scheme based on down-sampling may generate a distorted reduction image 320 or 330 that is completely different from the original image 310.

For example, according to a sampling factor, the reduction image 320 that is down-sampled by extracting only repeated white pixels or the reduction image 330 that is down-sampled by extracting only repeated black pixels may be generated based on a repetition cycle. Since the generated reduction image 320 or 330 has completely different characteristics from those of the original image 310, an error that may not be compensated, even in a post-processing operation of an image may occur. Thus, the characteristics of the original image 310 may not be restored.

Accordingly, in order to convert an image rate of an input image sequence by using image scaling, whether an original image includes a repeated pattern has to be determined first. If the image includes the repeated pattern, a method other than an image processing scheme using a down-sampled image of an input image may be used.

Figure 4:
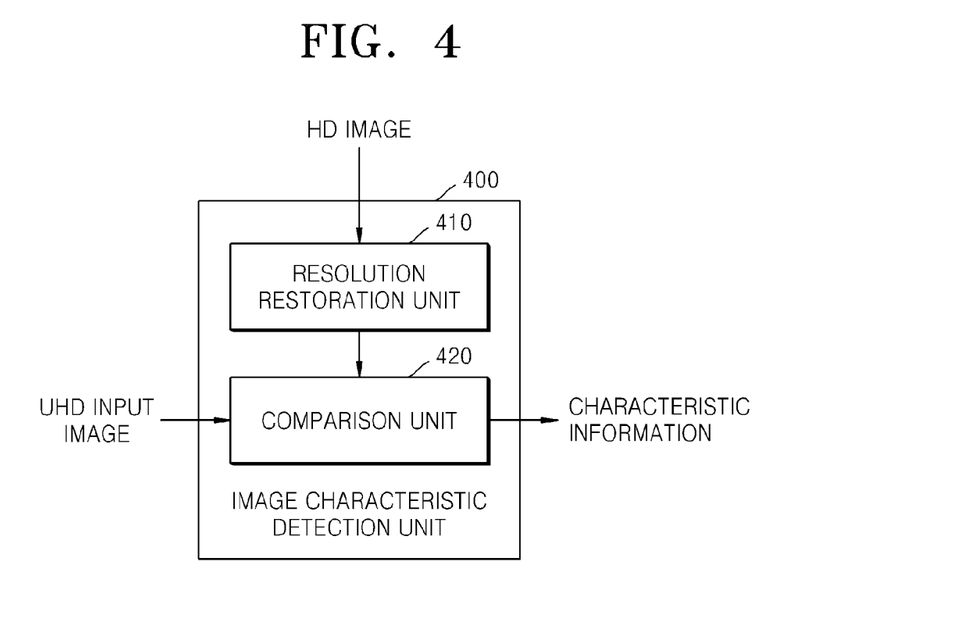
FIG. 4 is a block diagram of an image characteristic detection unit of the image rate conversion apparatus illustrated in FIG. 1 according to an aspect of an exemplary embodiment.

FIG. 4 is a block diagram of another example of the image characteristic detection unit 140 of the image rate conversion apparatus 100 illustrated in FIG. 1.

As another aspect of an exemplary embodiment of the image characteristic detection unit 140 of the image rate conversion apparatus 100, an image characteristic detection unit 400 may receive an original image of a UHD-level image sequence, and may detect detailed information.

The image characteristic detection unit 400 may include a resolution restoration unit 410 and a comparison unit 420.

If the image rate conversion apparatus 100 receives a UHD-level image sequence, the image scaling unit 110 may output an HD-level first image by reducing the resolution of the UHD input image.

The resolution restoration unit 410 may receive the HD-level first image from the image scaling unit 110, may restore the HD-level first image into a UHD-level image, and may output a UHD restoration image. The comparison unit 420 may receive and compare the UHD input image and the UHD restoration image, and may extract characteristic information of the UHD input image. For example, the comparison unit 420 may detect the characteristic information of the UHD input image based on a difference image between the UHD input image and the UHD restoration image.

Figure 5:
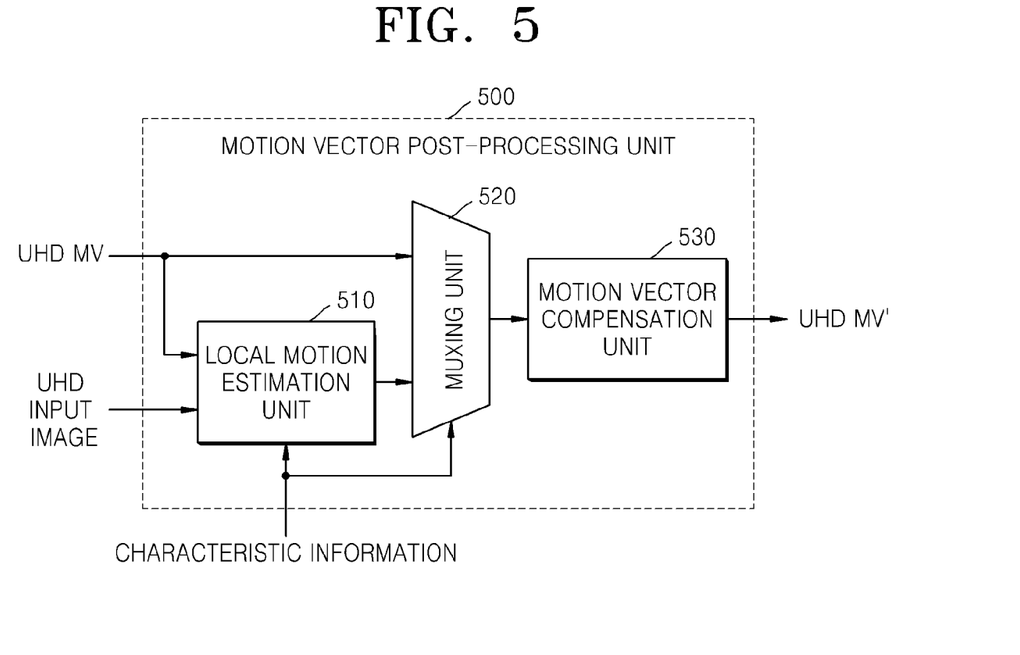
FIG. 5 is a block diagram of motion vector post-processing unit of the image rate conversion apparatus illustrated in FIG. 1 according to an aspect of an exemplary embodiment.

FIG. 5 is a block diagram of an example of the motion vector post-processing unit 150 of the image rate conversion apparatus 100 illustrated in FIG. 1.

As an exemplary embodiment of the motion vector post-processing unit 150 of the image rate conversion apparatus 100, a motion vector post-processing unit 500 may compensate a second motion vector restored to an original resolution by the motion vector scaling unit 130 and may determine a third motion vector corresponding to the original resolution by using the second motion vector and the characteristic information of the original image detected by the image characteristic detection unit 140, 200, or 400 illustrated in FIG. 1, 2, or 4.

If the image rate conversion apparatus 100 receives a UHD-level image sequence, the motion vector post-processing unit 500 may compensate a UHD motion vector UHD MV restored to a UHD-level resolution by the motion vector scaling unit 130, by using the UHD motion vector UHD MV and the characteristic information of a UHD input image detected by the image characteristic detection unit 140, 200, or 400, and may determine and output a compensated UHD motion vector UHD MV' corresponding to the UHD-level resolution.

The motion vector post-processing unit 500 may include a local motion estimation unit 510, a muxing unit 520, and a motion vector compensation unit 530.

The local motion estimation unit 510 may receive the UHD input image and the characteristic information detected from the UHD input image, and may determine a region of the UHD input image, of which detailed information is possibly lost due to a change of a resolution. The local motion estimation unit 510 may re-estimate motion of the region of the UHD input image, of which detailed information is possibly lost, and may locally re-detect a motion vector of the determined region.

The muxing unit 520 may combine the characteristic information of the UHD input image, the UHD motion vector UHD MV, and the motion vector re-detected by the local motion estimation unit 510. For example, the muxing unit 520 may change the UHD motion vector UHD MV corresponding to the local region determined based on the characteristic information into the motion vector re-detected by the local motion estimation unit 510.

The muxing unit 520 may compensate the UHD motion vector UHD MV by combining the UHD motion vector UHD MV and the re-detected motion vector, and the motion vector compensation unit 530 may output the compensated UHD motion vector UHD MV' corresponding to the UHD-level resolution.

Figure 6:
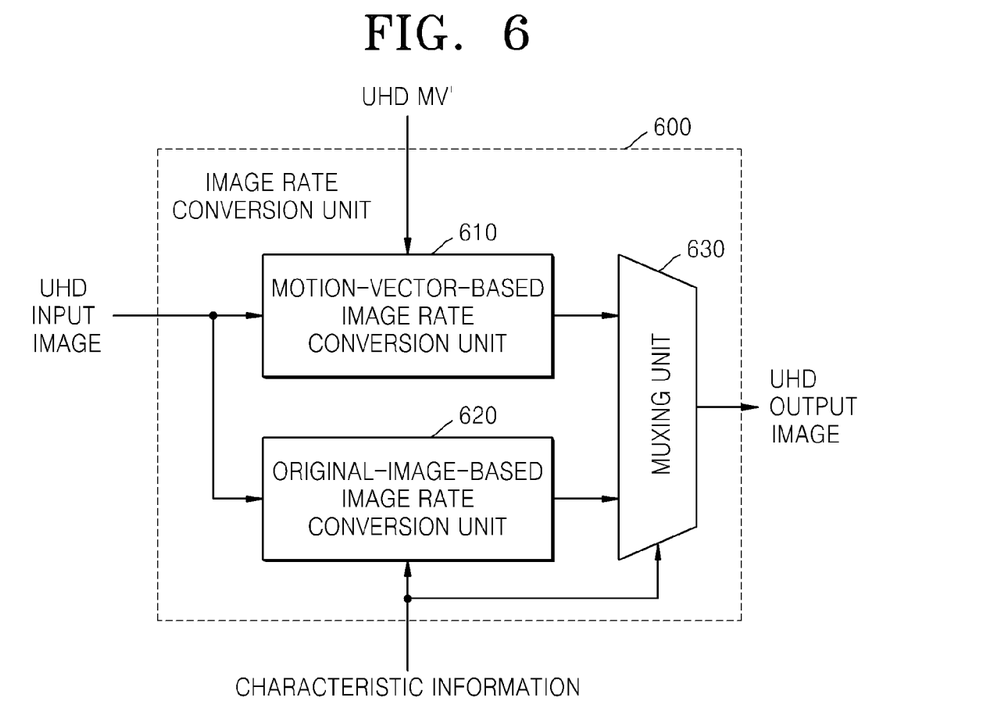
FIG. 6 is a block diagram of an image rate conversion unit of the image rate conversion apparatus illustrated in FIG. 1 according to an aspect of an exemplary embodiment.

FIG. 6 is a block diagram of an example of the image rate conversion unit 160 of the image rate conversion apparatus 100 illustrated in FIG. 1.

As an exemplary embodiment of the image rate conversion unit 160 of the image rate conversion apparatus 100, an image rate conversion unit 600 may generate a UHD output image based on the characteristic information of the UHD input image input from the image characteristic detection unit 140, 200, or 400 illustrated in FIG. 1, 2, or 4, and the compensated UHD motion vector UHD MV' input from the motion vector post-processing unit 150 or 500 illustrated in FIG. 1 or 5, and may output a UHD-level image sequence obtained by converting an image rate of a UHD-level input image sequence.

The image rate conversion unit 600 may include a motion-vector-based image rate conversion unit 610, an original-image-based image rate conversion unit 620, and a muxing unit 630.

The motion-vector-based image rate conversion unit 610 may generate a first UHD conversion image of the UHD input image by using the UHD input image and the compensated UHD motion vector UHD MV'. For example, in order to perform motion compensation on temporally continuous UHD input images, the motion-vector-based image rate conversion unit 610 may determine a reference image and a reference region for a divided region of a current image from among the UHD input images by using the compensated UHD motion vector UHD MV' input from the motion vector post-processing unit 150 or 500. The first UHD conversion image may be generated by performing motion compensation by using the reference region.

The original-image-based image rate conversion unit 620 may generate a second UHD conversion image of the UHD input image by using the UHD input image and the characteristic information. For example, the second UHD conversion image may be generated by interpolating two or more of the continuous UHD input images.

The muxing unit 630 may generate a UHD output image by selecting one of the first and second UHD conversion images based on the characteristic information of the UHD input image. Also, two or more output images may be determined with respect to one original image according to an image rate conversion ratio.

For example, the muxing unit 630 may determine a motion vector for generating an output image from the compensated UHD motion vector UHD MV' in consideration of the image rate conversion ratio. That is, in order to generate the output image, the first UHD conversion image may be generated by performing motion compensation by using the UHD input image and the motion vector, and the second UHD conversion image may be generated by using only at least one UHD input image. One of the generated first and second UHD conversion images may be selected and determined as the output image. A UHD output image may be determined by reconfiguring the generated conversion image and the UHD input image. Thus, a UHD-level output image sequence obtained by converting an image rate of a UHD-level input image sequence may be generated.

Figure 7:
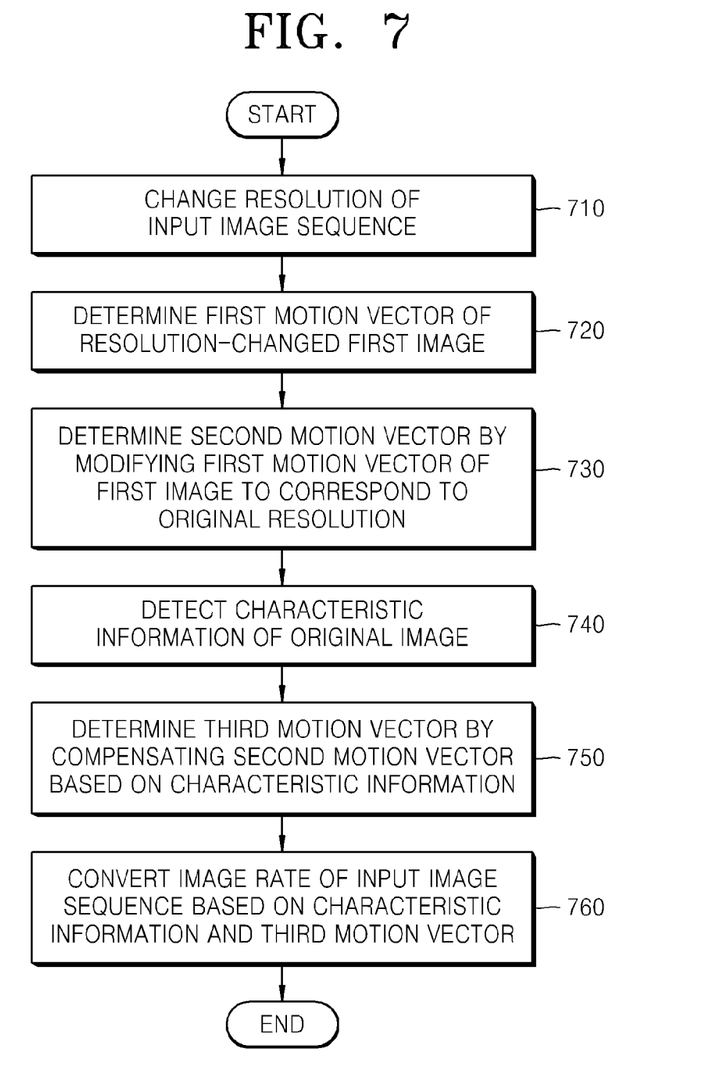
FIG. 7 is a flowchart of a method of converting an image rate by using image scaling, according to an exemplary embodiment.

FIG. 7 is a flowchart of a method of converting an image rate by using image scaling, according to an exemplary embodiment.

The image rate conversion method may be implemented by a processor such as an IPU or a GPU.

In operation 710, a resolution of an input image sequence is changed. A size of images of the input image sequence may also be changed.

In operation 720, a first motion vector is determined by estimating motion of a first image by using a plurality of images in an image sequence generated due to the change of the resolution (size) in operation 710. The first motion vector is a motion vector of the first image having the changed resolution.

In operation 730, a second motion vector is determined by modifying the first motion vector of the first image determined in operation 720 to correspond to a resolution (size) of an original image of the first image.

In operation 740, characteristic information of the original image is detected. Detailed information that is lost due to the change of the resolution (size) of the original image may be detected. The detailed information of the original image may include at least one of a high-frequency component and a repeated pattern of the original image.

According to another aspect of an exemplary embodiment, the original image may be compared to a restoration image obtained by restoring the first image to an original resolution, and the characteristic information of the original image may be detected based on a result of the comparing.

In operation 750, the second motion vector is compensated based on the characteristic information detected in operation 740, and a third motion vector corresponding to the resolution of the original image is ultimately determined.

According to an aspect of an exemplary embodiment, a motion vector of a region of the original image determined based on the characteristic information may be locally re-detected. The third motion vector obtained by compensating the second motion vector corresponding to the restored resolution may be determined based on the characteristic information, the second motion vector, and the re-detected motion vector. For example, the second motion vector corresponding to the region determined based on the characteristic information may be replaced by the re-detected motion vector, the second motion vector may be locally compensated, and the third motion vector may be ultimately determined.

In operation 760, an image rate of the input image sequence is converted based on the characteristic information of the original image detected in operation 740 and the third motion vector determined in operation 750. At least one conversion image may be generated based on the characteristic information of the original image and the third motion vector, an output image may be determined by reconfiguring the original image and the generated at least one conversion image. Thus, an ultimate image sequence having a different image rate from that of the input image sequence may be output.

Initially, a first conversion image of the original image may be generated by using the input image sequence and the third motion vector. Also, a second conversion image of the original image may be generated by combining only image data of the input image sequence. One of the first and second conversion images may be selected based on the characteristic information of the original image, and an image sequence having a converted image rate may be generated by combining selected conversion images.

In operation 720, if the first image is divided into two or more regions, first motion vectors of the divided regions may be separately determined. As such, second motion vectors and third motion vectors corresponding to the divided regions may be separately determined, and an image rate conversion scheme may be modified as described below.

In operation 730, the second motion vectors of original divided regions corresponding to the divided regions of the first image and having an original resolution may be separately determined by modifying the first motion vectors of the divided regions of the first image.

In operation 740, a region of which detailed information is probably lost due to image scaling is determined based on the characteristic information of the original image. In operation 750, a motion vector of the region of the original image determined based on the characteristic information is re-detected. A second motion vector corresponding to the region determined based on the characteristic information is compensated into the re-detected motion vector. As such, the third motion vectors of the original divided regions may be determined by combining the second motion vectors and the re-detected motion vector.

In operation 760, one of the first conversion image reconfigured by performing motion compensation using the third motion vectors separately determined with respect to the divided regions of the original image and the second conversion image generated by applying an image rate conversion scheme individually determined to each of the original divided region may be selected. Thus, an output image sequence obtained by converting the image rate of the input image sequence may be reconfigured.

Accordingly, a motion vector may be reconfigured in consideration of a region of which detailed information is lost due to a change of a resolution or a size of an image, a new image may be generated by using the reconfigured motion vector. Thus, an output image sequence obtained by converting an image rate of an input image sequence may be generated.

The block diagrams disclosed in the exemplary embodiments may be construed by one of ordinary skill in the art as conceptually expressing circuits for implementing the principles of the exemplary embodiments Similarly, it is obvious to one of ordinary skill in the art that a flowchart, a status transition view, a pseudo-code, or the like, may be substantially expressed in a computer-readable medium to denote various processes which can be executed by a computer or a processor whether or not the computer or the processor is clarified or not. Thus, the foregoing exemplary embodiments may be created as programs which can be executed by computers and may be implemented in a general digital computer operating the programs by using a computer-readable recording medium. The computer-readable medium may include storage mediums such as a magnetic storage medium (e.g., a ROM, a floppy disk, a hard disk, or the like), an optical reading medium (e.g., a CD-ROM, a DVD, or the like).

Functions of various elements illustrated in the drawings may be provided by the use of dedicated hardware as well as by hardware which is related to appropriate software and can execute the software. When provided by a processor, such functions may be provided by a single dedicated processor, a single shared processor, or a plurality of individual processors which can share some of the functions. Also, the stated use of terms "processor" or "controller" should not be construed to exclusively designate hardware which can execute software and may tacitly include digital signal processor (DSP) hardware, a ROM for storing software, a RAM, and a non-volatile storage device, without any limitation.

In the claims, elements expressed as units for performing particular functions may cover a certain method performing a particular function, and such elements may include a combination of circuit elements performing particular functions, or software in a certain form including firmware, microcodes, or the like, combined with appropriate circuits to execute software for performing particular functions.

Designation of 'an embodiment' or 'an exemplary embodiment' of the principles of the inventive concept and various modifications of such an expression may mean that particular features, structures, characteristics, and the like, in relation to this embodiment may be included in at least one embodiment of the principle of the inventive concept. Thus, the expression 'an embodiment' or 'an exemplary embodiment' and any other modifications disclosed throughout the entirety of the disclosure of the inventive concept may not necessarily designate the same embodiment.

In the specification, in a case of 'at least one of A and B', the expression of 'at least one among ~' is used to cover only a selection of a first option (A), only a selection of a second option (B), or a selection of both options (A and B). In another example, in a case of 'at least one of A, B, and C', the expression of 'at least one among ~' is used to cover only a selection of a first option (A), only a selection of a second option (B), only a selection of a third option (C), only a selection of the first and second options (A and B), only a selection of the second and third options (B and C), or a selection of all of the three options (A, B, and C). Even when more items are enumerated, it will be obvious to one of ordinary skill in the art that they can be definitely extendedly construed.

While the inventive concept has been particularly shown and described with reference to exemplary embodiments thereof, it will be understood by one of ordinary skill in the art that various changes in form and details may be made therein without departing from the spirit and scope of the inventive concept as defined by the following claims. The exemplary embodiments should be considered in a descriptive sense only and not for purposes of limitation. Therefore, the scope of the exemplary embodiments is defined not by the detailed description but by the following claims, and all differences within the scope will be construed as being included in the exemplary embodiments.

What is claimed is:

1. A method of converting an image rate by using image scaling, the method being implemented by a processor and comprising:
    changing a resolution of an input original image sequence and generating a changed resolution image sequence;
    determining a first motion vector by estimating motion of a first image by using a plurality of images from the changed resolution image sequence;
    determining a second motion vector by modifying the first motion vector of the first image to correspond to a resolution of an original image of the original image sequence, wherein the original image corresponds to the first image;
    detecting characteristic information of the original image;
    determining a third motion vector corresponding to the resolution of the original image by compensating the second motion vector based on the detected characteristic information; and
    converting an image rate of the input original image sequence based on the detected characteristic information of the original image and the third motion vector.

2. The method of claim 1, wherein the determining of the third motion vector comprises:
    re-detecting a motion vector of a region of the original image determined based on the detected characteristic information; and
    determining the third motion vector by combining the detected characteristic information, the second motion vector, and the re-detected motion vector.

3. The method of claim 1, wherein the converting of the image rate comprises:
    generating a first conversion image of the original image for converting the image rate of the input original image sequence, by using the input original image sequence and the third motion vector;
    generating a second conversion image of the original image for converting the image rate of the input original image sequence, by using the input original image sequence; and
    selecting and outputting the first conversion image or the second conversion image based on the detected characteristic information.

4. The method of claim 3, wherein the generating of the first conversion image comprises generating two or more first conversion images based on the image rate,
    wherein the generating of the second conversion image comprises generating two or more second conversion images based on the image rate, and
    wherein the selecting and outputting of one of the first and second conversion images comprises selecting and outputting at least one of each corresponding pair of the generated two or more first conversion images and the two or more second conversion images based on the detected characteristic information.

5. The method of claim 3, wherein the generating of the second conversion image comprises generating the second conversion image by interpolating two or more of previous and subsequent images of the original image in the input original image sequence.

6. The method of claim 1, wherein the detecting of the characteristic information comprises detecting detailed information that is lost due to the changing of the resolution of the original image, and wherein the detailed information comprises at least one of a high-frequency component and a repeated pattern of the original image.

7. The method of claim 1, wherein the detecting of the characteristic information comprises:
comparing the original image to a restoration image obtained by restoring the first image to the resolution of the original image; and
detecting the characteristic information of the original image based on a result of the comparing.

8. The method of claim 1, wherein the determining of the third motion vector comprises:
determining a region of the original image of which detailed information is lost due to the changing of the resolution, based on the detected characteristic information;
re-detecting a motion vector of the determined region of the original image; and
determining the third motion vector by compensating the second motion vector corresponding to the determined region, into the re-detected motion vector.

9. The method of claim 1, wherein the determining of the first motion vector comprises separately determining first motion vectors of spatially divided regions of the first image.

10. The method of claim 9, wherein the determining of the second motion vector comprises separately determining second motion vectors corresponding to the divided regions of the first image by modifying the first motion vectors with respect to divided regions of the original image corresponding to the divided regions of the first image, wherein the divided regions of the original image have a resolution corresponding to the resolution of the original image, and
wherein the determining of the third motion vector comprises:
re-detecting a motion vector of a region of the original image determined based on the detected characteristic information;
compensating a second motion vector corresponding to the determined region from among the second motion vectors of the original divided regions, into the re-detected motion vector; and
determining third motion vectors of the original divided regions by combining the second motion vectors and the re-detected motion vector.

11. An apparatus for converting an image rate by using image scaling, the apparatus being associated with an image processor and comprising:
an image scaling unit which changes a resolution of an input original image sequence and generates a changed resolution image sequence;
a motion estimation unit which determines a first motion vector by estimating motion of a first image by using a plurality of images of the changed resolution image sequence;
a motion vector scaling unit which determines a second motion vector by modifying the first motion vector of the first image to correspond to a resolution of an original image of the original image sequence, wherein the original image corresponds to the first image;
an image characteristic detection unit which detects characteristic information of the original image;
a motion vector post-processing unit which determines a third motion vector corresponding to the resolution of the original image by compensating the second motion vector based on the detected characteristic information; and
an image rate conversion unit which converts an image rate of the input original image sequence based on the detected characteristic information of the original image and the third motion vector,
wherein one of the image characteristic detection unit, the motion vector post-processing unit, and the image rate conversion unit is capable of being configured by the image processor.

12. The apparatus of claim 11, wherein the motion vector post-processing unit re-detects a motion vector of a region of the original image determined based on the detected characteristic information, and determines the third motion vector by combining the detected characteristic information, the second motion vector, and the re-detected motion vector.

13. The apparatus of claim 11, wherein the image rate conversion unit generates a first conversion image of the original image for converting the image rate of the input original image sequence, by using the input original image sequence and the third motion vector, generates a second conversion image of the original image for converting the image rate of the input original image sequence, by using the input original image sequence, and selects and outputs one of the first conversion image and the second conversion image based on the detected characteristic information, and
wherein two or more first conversion images and two or more second conversion images are generated based on the image rate.

14. The apparatus of claim 13, wherein the image rate conversion unit generates the second conversion image by interpolating two or more of previous and subsequent images of the original image in the input original image sequence.

15. The apparatus of claim 11, wherein the image characteristic detection unit detects detailed information that is lost due to the changing of the resolution of the original image, and
wherein the detailed information comprises at least one of a high-frequency component and a repeated pattern of the original image.

16. The apparatus of claim 11, wherein the image characteristic detection unit compares the original image to a restoration image obtained by restoring the first image to the resolution of the original image, and detects the characteristic information of the original image based on a result of the comparing.

17. The apparatus of claim 11, wherein the motion vector post-processing unit determines a region of the original image of which detailed information is lost due to the changing of the resolution, based on the detected characteristic information, re-detects a motion vector of the determined region of the original image, and determines the third motion vector by compensating the second motion vector corresponding to the determined region, into the re-detected motion vector.

18. The apparatus of claim 11, wherein the motion estimation unit separately determines first motion vectors of spatially divided regions of the first image.

19. The apparatus of claim 18, wherein the motion vector scaling unit separately determines second motion vectors corresponding to the divided regions of the first image by modifying the first motion vectors with respect to divided regions of the original image corresponding to the divided regions of the first image, wherein the divided regions of the original image have a resolution corresponding to the resolution of the original image, and
wherein the motion vector compensation unit re-detects a motion vector of a region of the original image determined based on the detected characteristic information, compensates a second motion vector corresponding to the determined region from among the second motion vectors of the original divided regions, into the re-detected motion vector, and determines third motion vectors of the original divided regions by combining the second motion vectors and the re-detected motion vector.

20. A non-transitory computer-readable recording medium having recorded thereon a computer program for executing the method of claim 1.

21. A method of converting an image rate by using image scaling, the method being implemented by a processor and comprising:
　determining a first motion vector by estimating motion of a first image of a changed resolution image sequence by using a plurality of images from the changed resolution image sequence;
　determining a second motion vector by modifying the first motion vector of the first image to correspond to a resolution of an original image of an original image sequence, wherein the original image corresponds to the first image of the changed resolution image sequence;
　determining a third motion vector corresponding to the resolution of the original image by compensating the second motion vector based on detected characteristic information of the original image; and
　converting an image rate of the original image sequence based on the detected characteristic information of the original image and the third motion vector.

22. The method of claim 21, wherein the detecting of the characteristic information comprises detecting detailed information that is lost due to the changing of the resolution of the original image, and
　wherein the detailed information comprises a high-frequency component or a repeated pattern of the original image.

23. The method of claim 21, wherein the detecting of the characteristic information comprises:
　comparing the original image to a restoration image obtained by restoring the first image to the resolution of the original image; and
　detecting the characteristic information of the original image based on a result of the comparing.

* * * * *